US 7,912,224 B2

(12) United States Patent
Lee et al.

(10) Patent No.: US 7,912,224 B2
(45) Date of Patent: Mar. 22, 2011

(54) WIRELESS NETWORK SYSTEM AND COMMUNICATION METHOD FOR EXTERNAL DEVICE TO TEMPORARILY ACCESS WIRELESS NETWORK

(75) Inventors: Sung-min Lee, Seoul (KR); Seung-jae Oh, Suwon-si (KR); Se-hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1449 days.

(21) Appl. No.: 11/346,283

(22) Filed: Feb. 3, 2006

(65) Prior Publication Data
US 2006/0171540 A1    Aug. 3, 2006

(30) Foreign Application Priority Data

Feb. 3, 2005 (KR) ................... 10-2005-0010069

(51) Int. Cl.
H04L 9/08 (2006.01)
(52) U.S. Cl. ........................................................ 380/278
(58) Field of Classification Search .................. 380/270, 380/278, 248, 249; 713/170–178
See application file for complete search history.

(56) References Cited

U.S. PATENT DOCUMENTS

| | | | | |
|---|---|---|---|---|
| 5,889,861 A * | 3/1999 | Ohashi et al. | ................. | 380/247 |
| 6,201,871 B1 * | 3/2001 | Bostley et al. | ................. | 380/249 |
| 6,782,260 B2 * | 8/2004 | Nakakita et al. | ............ | 455/435.1 |
| 7,055,032 B2 * | 5/2006 | Sandhu et al. | ................. | 713/171 |
| 7,221,762 B2 * | 5/2007 | Gentry et al. | ................. | 380/268 |
| 7,324,805 B2 * | 1/2008 | Nakakita et al. | ............... | 455/411 |
| 7,362,869 B2 * | 4/2008 | Landrock | ....................... | 380/277 |
| 7,590,246 B2 * | 9/2009 | Calmels et al. | ................. | 380/270 |
| 2002/0018569 A1 * | 2/2002 | Panjwani et al. | ............. | 380/247 |
| 2003/0087629 A1 * | 5/2003 | Juitt et al. | ....................... | 455/411 |
| 2003/0191937 A1 * | 10/2003 | Balissat et al. | ................. | 713/163 |
| 2004/0006713 A1 * | 1/2004 | Minemura | .................... | 713/201 |
| 2004/0030895 A1 * | 2/2004 | Tachikawa | .................... | 713/168 |
| 2004/0053601 A1 * | 3/2004 | Frank et al. | .................... | 455/411 |
| 2005/0078824 A1 * | 4/2005 | Malinen et al. | ................ | 380/247 |
| 2005/0088980 A1 * | 4/2005 | Olkkonen et al. | ............ | 370/255 |
| 2005/0136892 A1 * | 6/2005 | Oesterling et al. | ............ | 455/411 |
| 2005/0154909 A1 * | 7/2005 | Zhang et al. | .................... | 713/200 |
| 2006/0064458 A1 * | 3/2006 | Gehrmann | ..................... | 709/203 |
| 2006/0178131 A1 * | 8/2006 | Huotari et al. | ................ | 455/410 |

FOREIGN PATENT DOCUMENTS

| | | |
|---|---|---|
| JP | 09-271072 A | 10/1997 |
| JP | 2003-032742 A | 1/2003 |
| JP | 2003-110569 A | 4/2003 |
| JP | 2004-7351 A | 1/2004 |
| JP | 2004-320731 A | 11/2004 |
| KR | 10-2002-0051127 A | 6/2002 |
| WO | WO 2004/001658 A1 | 12/2003 |

\* cited by examiner

*Primary Examiner* — William R Korzuch
*Assistant Examiner* — Abdullah Almamun
(74) *Attorney, Agent, or Firm* — Sughrue Mion, PLLC (57) ABSTRACT

A wireless network system and a communication method, where an external network device easily and temporarily logs in and out of the wireless network. A key management device of the wireless network system includes a limited communication unit that receives encryption information from a wireless network device, a storage unit that stores authentication information for authenticating the wireless network device, and a key creating unit that creates an encryption key using the received encryption information to allow the wireless network device to log onto the wireless network. The key creating unit also transmits the created encryption key to the wireless network device.

38 Claims, 7 Drawing Sheets

WIRELESS NETWORK SYSTEM AND COMMUNICATION METHOD FOR EXTERNAL DEVICE TO TEMPORARILY ACCESS WIRELESS NETWORK

CROSS-REFERENCE TO RELATED APPLICATION

This application claims priority from Korean Patent Application No. 10-2005-0010069 filed on Feb. 3, 2005 in the Korean Intellectual Property Office, the disclosure of which is incorporated herein by reference in its entirety.

BACKGROUND OF THE INVENTION

1. Field of the invention

The present invention broadly relates to a wireless network system and a communication method using the same and, more particularly, to a wireless network system and a communication method that allows an external network device that temporarily accesses the wireless network, to easily log in and out of the wireless network.

2. Description of the Prior Art

Recently, with the development of communication and network technologies, coaxial/optical cable networks are being changed to wireless networks that use various frequency bands.

Unlike the cable network system, the wireless network system does not provide a physically fixed data transmission path. Therefore, the wireless network system is more vulnerable to security attacks than the cable network system. To safely perform wireless communication, most wireless communication protocols support encryption of the data packets that are transmitted through the network. For example, the Wi-Fi protected access pre-shared key (WPA-PSK) system used in a wireless local area network (LAN) or the wired equivalent privacy (WEP) system is used to more safely perform the wireless communication.

The WEP system was designed to provide minimum protection to wirelessly-transmitted frames. Therefore, the WEP system has security problems in that it disturbs a widespread construction of IEEE 802.11 technology. Such problems are a design defect of the WEP system.

IEEE 802.1x is based on an extensible authentication protocol (EAP), which is formally specified in RFC 2284.

Figure 1:
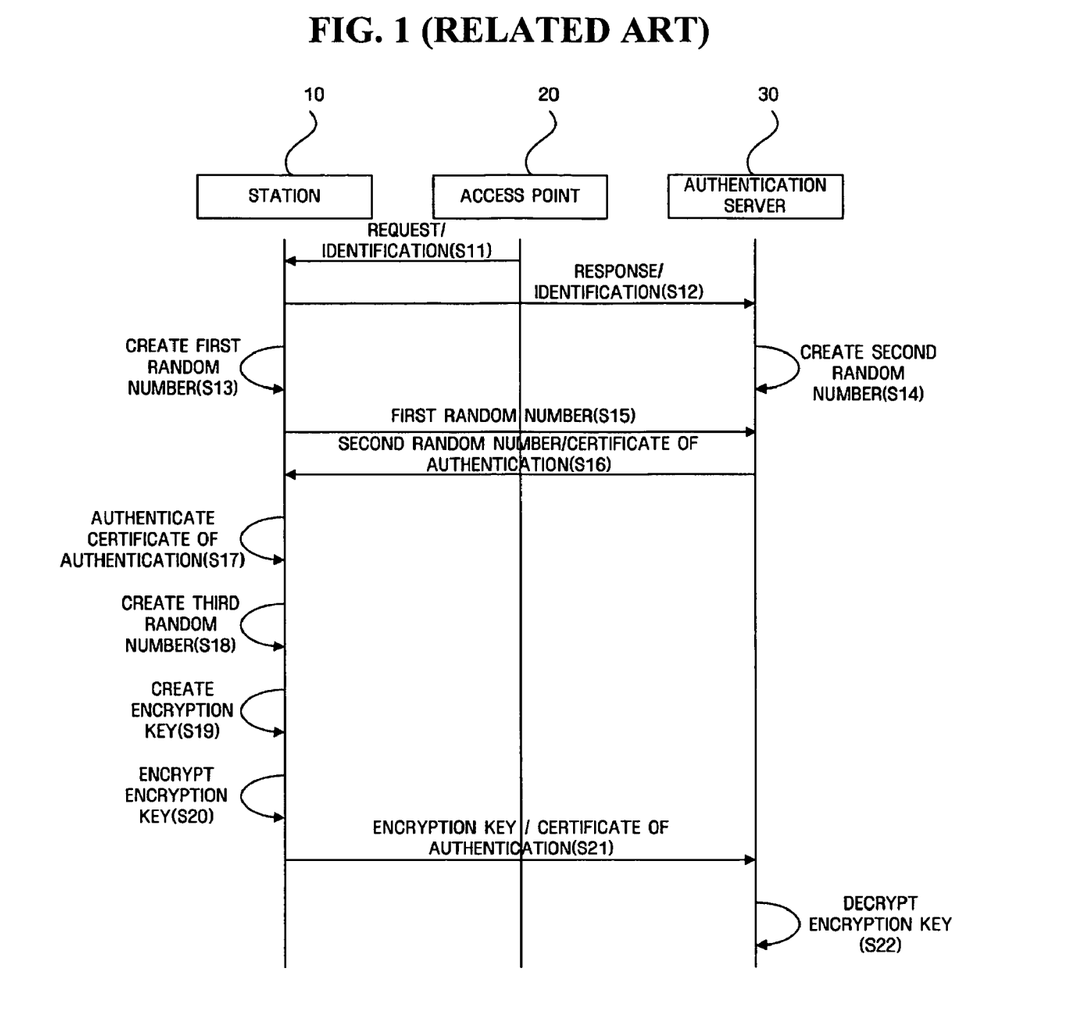
FIG. 1 is a view illustrating the procedure of creating an encryption key according to the related art.

FIG. 1 illustrates the procedure of creating an encryption key according to the related art. An access point 20 of FIG. 1 serves to relay messages between a station 10 and an authentication server 30.

As shown in FIG. 1, the access point 20 transmits request/identification messages to the station 10 to identify a user, in operation S11. Then, the station 10 transmits response/identification messages including user identification (e.g., MyID) to the authentication server 30, in operation S12.

Then, the station 10 and the authentication server 30, respectively, create a first random number and a second random number to prevent the messages from being reused by another party, in operations S13 and S14, and exchange the random numbers in operations S15 and S16. At this time, the random number means a numeral or character string having randomness.

Further, the authentication server 30 transmits a certificate of authentication issued from a certificate authority to the station 10 along with the second random number in operation S16.

The station 10 authenticates the certificate of authentication transmitted from the authentication server 30 using a public key of the certificate authority (i.e., the authentication server 30) in operation S17, and creates a third random number of a predetermined size (e.g., 48 bytes) in operation S18.

The station 10 creates an encryption key using the first to third random numbers in operation S19, and encrypts the encryption key using the public key of the authentication server 30 included in the authentication certificate of the authentication server 30 in operation S20. Then, the station 10 transmits the encrypted key and its authentication certificate to the authentication server 30 in operation S21.

The authentication server 30 authenticates the authentication certificate of the station 10 by decrypting the public key of the certificate authority, and then decrypts the received encryption key using its secret key in order to use the decrypted key as an encryption key, in operation S22.

Then, the station 10 and the authentication server 30 share the encryption key, and create a final encryption key using the shared encryption key, the first random number and the second random number, and perform mutual wireless communication using the final encryption key.

The aforementioned procedure of creating the encryption key enables safe wireless communication between wireless network devices having an authentication certificate issued from a separate certificate authority.

To allow a new wireless network device to temporarily access a corresponding wireless network, this new wireless network device should be provided with an authentication certificate issued by the certificate authority. The authentication certificate should have a temporary term of validity. The wireless network device having such an authentication certificate can access the wireless network only for the allowed term specified in the issued certificate of authentication.

However, the procedure of issuing the certificate of authentication from the certificate authority is performed separately from the procedure of accessing the wireless network. In other words, the wireless network device accesses the certificate authority using a system connected to the certificate authority through a cable in order to obtain the authentication certificate issued by a predetermined issuing procedure. Then, the wireless network device transmits the issued certificate of authentication to the wireless network device using a predetermined mobile storage medium such as a diskette or a smart card.

Then, the wireless network device logs onto the corresponding wireless network. To prevent the wireless network device from logging in to the wireless network without permission, the wireless network device should be provided with the authentication certificate issued by the certificate authority. Also, if the wireless network device frequently logs onto the wireless network, the procedure of issuing and discarding the authentication certificate must be repeated. This makes it more difficult for the wireless network manager to manage the network.

Korean Patent Unexamined Publication No. 2002-0051127 discloses a method of wirelessly transmitting authentication data and encryption/decryption data processed by a smart card to a cellular phone by performing local communication between the cellular phone and the smart card through a high speed wireless modem chip if authentication and encryption/decryption functions are requested by an authentication server or a user. This related art method is to ensure reliable communication by transmitting and receiving data at a high speed through the high speed wireless modem chip. However, this method is not suitable for authenticating a network device that temporarily logs onto a wireless network, or for preventing a network device from logging onto the wireless network without permission.

SUMMARY OF THE INVENTION

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

The present invention is provides a wireless network system and a communication method where an external network device easily and temporarily logs onto a wireless network by providing authentication information to the external network device through devices existing in the wireless network.

According to an aspect of the present invention, there is provided a key management device, which comprises a limited communication unit receiving encryption information from a wireless network device, a storage unit storing authentication information for authentication of the wireless network device, and a key creating unit creating an encryption key through the received encryption information to allow the wireless network device to log onto a wireless network. The key creating unit also transmits the created encryption key to the wireless network device.

According to another aspect of the present invention, there is provided a wireless network system comprising a limited communication unit transmitting and receiving encryption information from and to a key management device that creates an encryption key, a wireless communication unit performing communication with an access point of a predetermined wireless network, and a controller receiving the created encryption key from the key management device and performing wireless communication with the access point of the wireless network using the received encryption key.

According to yet another aspect of the present invention, there is provided an access point comprising an encryption information management unit issuing encryption information for authentication of a wireless network device logging onto a wireless network, a limited communication unit performing communication with a key management device that transmits an encryption key to the wireless network device, a wireless communication unit performing communication with the wireless network device, and a controller performing authentication of the wireless network device and performing communication with the authenticated wireless network device using the encryption key.

According to yet another aspect of the present invention, there is provided a key management method comprising receiving encryption information from a wireless network device, storing authentication information for authentication of the wireless network device, and creating an encryption key through the received encryption information to allow the wireless network device to log onto a wireless network and transmitting the created encryption key to the wireless network device.

According to another aspect of the present invention, there is provided a communication method of a wireless network system comprising transmitting encryption information to a key management device that creates an encryption key, receiving the created encryption key from the key management device and performing wireless communication with an access point of a wireless network using the received encryption key.

According to another aspect of the present invention, there is provided a communication method of an access point comprising transmitting encryption information to a wireless network device logging onto a wireless network, receiving an encryption key transmitted from the wireless network device, and performing authentication of the wireless network device and performing communication with the authenticated wireless network device using the encryption key.

BRIEF DESCRIPTION OF THE DRAWINGS

The above and other aspects of the present invention will become more apparent from the following detailed description of exemplary embodiments taken in conjunction with the accompanying drawings, in which.

DETAILED DESCRIPTION OF EXEMPLARY EMBODIMENTS OF THE INVENTION

Hereinafter, exemplary, non-limiting embodiments of the present invention will be described in detail with reference to the accompanying drawings. The aspects and features of the present invention and methods for achieving the aspects and features will be apparent by referring to the exemplary, non-limiting embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the whole description of the exemplary, non-limiting embodiments of the present invention, the same drawing reference numerals are used for analogous elements across various figures.

Figure 2:
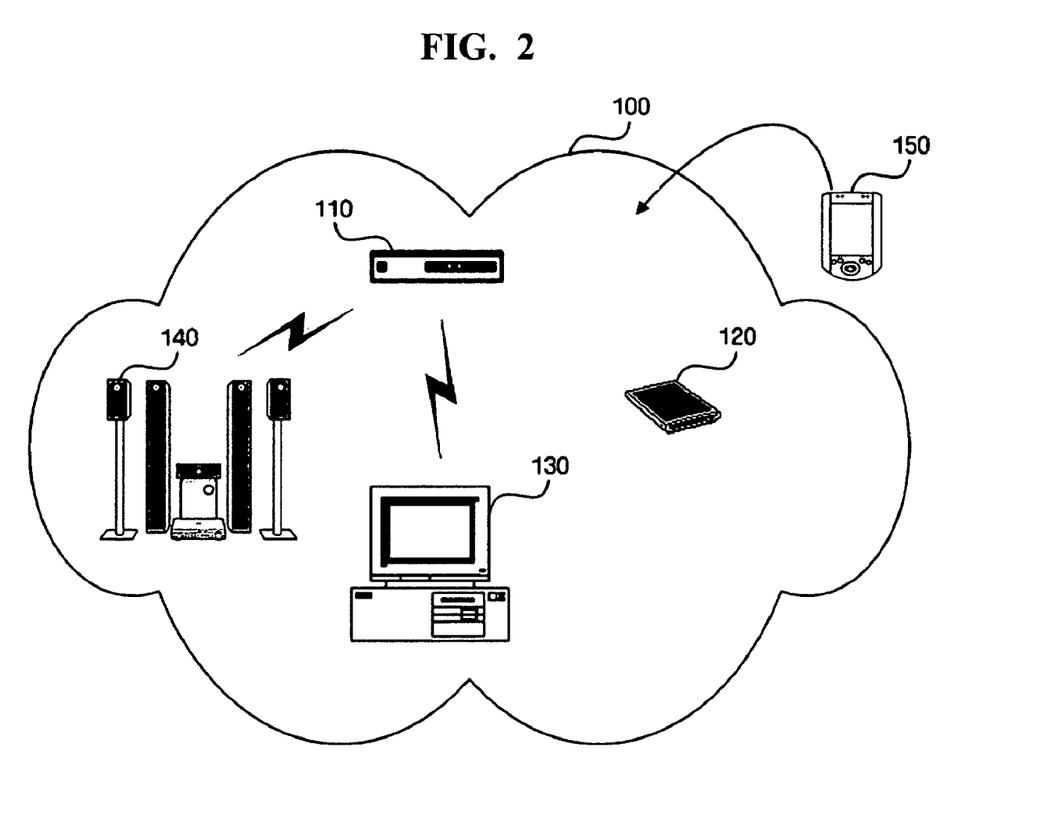
FIG. 2 is a view illustrating a wireless network according to an exemplary, non-limiting embodiment of the present invention.

FIG. 2 illustrates a wireless network according to the exemplary, non-limiting embodiment of the present invention.

As shown in FIG. 2, a wireless network 100 includes an access point 110, a key management device 120, one or more stations 130 and 140. An external device 150 is located outside the network 100.

Hereinafter, the stations 130 and 140 constituting the wireless network 100 are referred to as "wireless network devices" in the exemplary embodiment of the present invention. Also, the access point 110 and the stations 130 and 140 can maintain communication security using the EAP.

In an exemplary, non-limiting embodiment of the present invention, a station is a wireless network device, such as notebook computer, cellular phone, digital TV, or set top box that can access a wireless network. An access point is a network access controller that controls access to the wireless network. In an exemplary, non-limiting embodiment of the present invention, the access point and the station can be those defined in the IEEE 802.11 standard.

Figure 3:
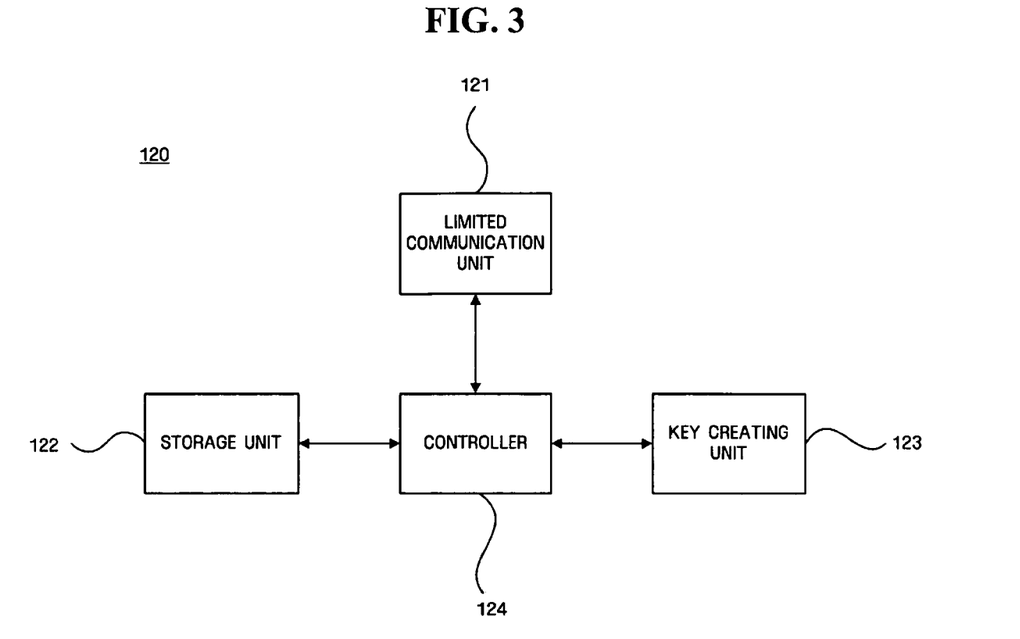
FIG. 3 is a block diagram illustrating the construction of a key management device according to an exemplary, non-limiting embodiment of the present invention.

FIG. 3 illustrates the key management device according to an exemplary, non-limiting embodiment of the present invention.

The key management device 120 includes a nonvolatile memory such as a flash memory that can read, write, and erase data. The key management device 120 may be a mobile device including the nonvolatile memory as needed. For example, the key management device 120 may be a portable storage device such as a smart card or a multimedia card, or a portable communication device such as a cellular phone or a personal data assistant (PDA).

The exemplary key management device 120 depicted in FIG. 3 includes a limited communication unit 121 for transmitting encryption information to and receiving encryption information from the wireless network device, a storage unit 122 for storing authentication information for authentication of an external network device 150 if the external network device 150 logs onto the wireless network 100, a key creating unit 123 for creating an encryption key through the transmitted and received encryption information, and a controller 124 for performing authentication of the external network device 150 if the external network device 150 logs onto the wireless network 100, and for transmitting the created encryption key to the external network device 150.

The limited communication unit 121 has a communication radius smaller than that of the wireless network devices included in the wireless network 100. The communication radius is made smaller to prevent external eavesdropping. For example, the limited communication unit 121 may use an infrared, a Bluetooth, or a local communication protocol. These exemplary description of the communication unit 121 is provided by way of an example only and not by way of a limitation. One of ordinary skill in the art would readily understand that many variations to the described communication unit 121 are within the scope of the invention.

Examples of encryption information are a first random number created by the wireless network device, a second random number created by the access point 110, and a machine access control (MAC) address of the wireless network device. Also, examples of the authentication information are a certificate of authentication issued by the access point 110, and a secret key. The access point 110 according to an exemplary, non-limiting embodiment of the present invention can authenticate a wireless network device that desires to log onto the wireless network 100, and can issue all the certificates of authentication in addition to performing the communication with the wireless network device.

Furthermore, the certificate of authentication stored in the storage unit 122 includes a root certificate of authentication (hereinafter, referred to as a "first certificate of authentication") issued by the access point 110 that serves as a certificate authority, and a certificate of authentication (hereinafter, referred to as "second certificate of authentication") of the key management device 120. The first certificate of authentication includes a public key that authenticates all the certificates of authentication issued by the access point 110. The secret key stored in the storage unit 122 may be issued by the access point 110 and provided to the key management device 120 for storage in the storage unit 122.

Therefore, the key management device 120 can be aware of the aforementioned public key because the first certificate of authentication is stored therein. Also, the key management device 120 can authenticate all the certificates of authentication issued by the access point 110.

Furthermore, the MAC address of the wireless network device is stored in the storage unit 122 because that the wireless network device can become disconnected from the wireless network 100 after it is identified.

The key creating unit 123 creates a third random number along with the first random number and the second random number in order to create the encryption key. The controller 124 encrypts the created encryption key using the public key included in the certificate of authentication (hereinafter, referred to as the "third certificate of authentication") included in the certificate of authentication issued by the access point 110, and transmits the encryption key to the wireless network device through the limited communication unit 121. At this time, a value that electronically signs a hash value of all the messages using the secret key stored in the storage unit 122 is transmitted to the wireless network device along with the encryption key.

The encryption key and the electronically signed hash value are used to either create a key for communication between the wireless network device and the access point 110, or to allow the access point 110 to authenticate the wireless network device.

Figure 4:
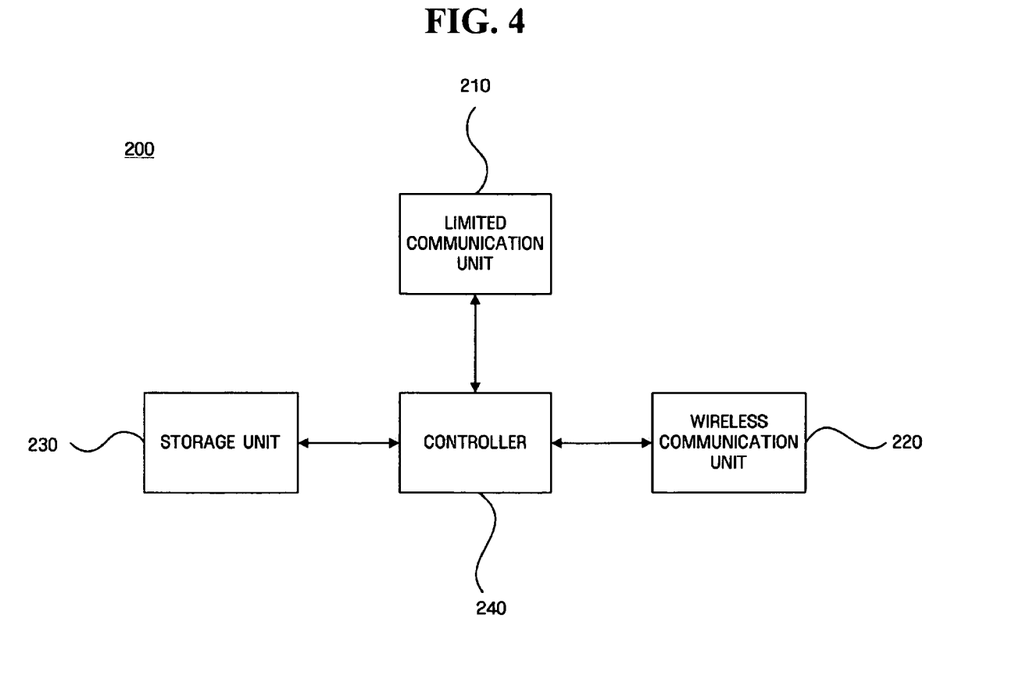
FIG. 4 is a block diagram illustrating the construction of a wireless network system according to an exemplary, non-limiting embodiment of the present invention.

FIG. 4 illustrates the wireless network device according to an exemplary, non-limiting embodiment of the present invention. The wireless network device 200 shown in FIG. 4 can be the stations 130 and 140 and the external network device 150 shown in FIG. 2. The respective stations of FIG. 4 can be used in a similar manner as those of FIG. 2.

As shown in FIG. 4, the wireless network device 200 according to the an exemplary, non-limiting embodiment of the present invention includes a limited communication unit 210 for transmitting encryption information to and receiving encryption information from the key management device 120, a wireless communication unit 220 for wirelessly communicating with the access point 110, a storage unit 230 for storing an electronically signed hash value and the encryption key transmitted by the key management device 120, and a controller 240 for performing authentication with the access point 110 using the encryption key stored in the storage unit 230. The storage unit 230 also stores the first certificate of authentication transmitted by the key management device 120. The first certificate of authentication is a root certificate of authentication issued by the access point 110 that serves as a certificate authority. The wireless network device 200 can authenticate all the certificates of authentication issued by the access point 110 using the public key included in the first certificate of authentication.

The controller 240 creates a predetermined first random number and transmits the created random number to the access point 110. Also, the controller 240 receives a second random number and a third certificate of authentication from the access point 110. At this time, the controller 240 can authenticate the received second certificate of authentication of the access point 110 using the public key included in the first certificate of authentication.

Then, the controller 240 transmits the first random number, the second random number, the third certificate of authentication, and the hash value of the messages transmitted to and received from the access point to the key management device 120. The controller 240 can perform authentication with the access point 110 through the received encryption key. At this time, the encryption key received from the key management device 120 is encrypted using the public key included in the third certificate of authentication stored in the storage unit 122 of the key management device 120. Also, the controller 240 can receive the hash value electronically signed by the secret key of the key management device along with the encryption key. The encryption key and the electronically signed hash value can be used for authentication between the access point 110 and the wireless network device. In other words, the controller 240 transmits the encryption key and the electronically signed hash value to the access point 110 along with the second certificate of authentication of the key management device 120. Therefore, the access point 110 authenticates the received certificate of authentication of the key management device 120 to identify the public key of the key management device 120, and authenticates the electronically signed hash value received from the wireless network device 200 using the authenticated public key to determine whether the wireless network device 200 has logged onto the wireless network 100. Then, the controller 240 decrypts the encryption key to create a key used for communication between the wireless network device and the access point.

Figure 5:
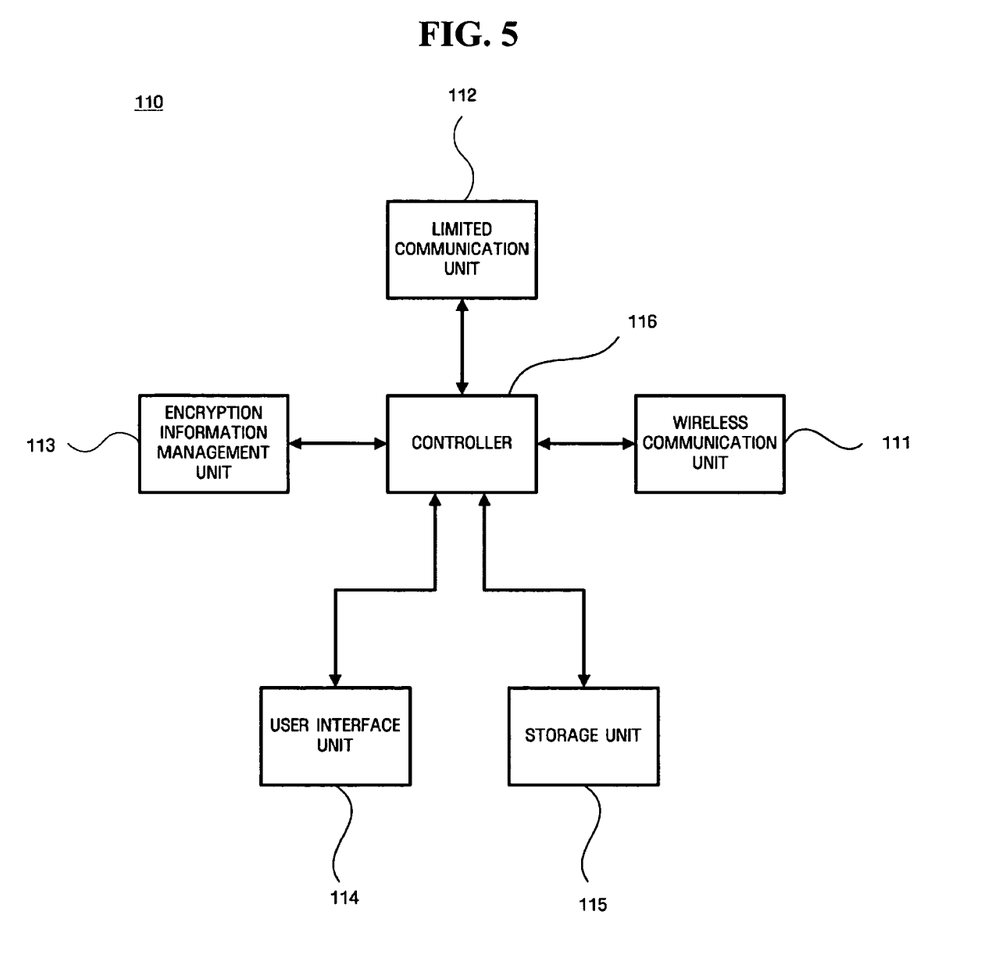
FIG. 5 is a block diagram illustrating the construction of an access point according to an exemplary, non-limiting embodiment of the present invention.

FIG. 5 illustrates the access point according to an exemplary, non-limiting embodiment of the present invention.

As shown in FIG. 5, the access point 110 includes a wireless communication unit 111 for communicating with the wireless network device 200, a limited communication unit 112 for communicating with the key management device 120, an encryption information management unit 113 for creating encryption information, a user interface unit 114 for allowing a user to input a control command of the access point 110, a storage unit 115 for storing authentication information, and a controller 116 for performing authentication for the wireless network devices of the wireless network 100.

The wireless communication unit 111 can be used to receive the first random number created by the wireless network device 200, and transmit the second random number and the third certificate of authentication from the access point 110. The third certificate of authentication is one that serves to identify the access point 110. The third certificate of authentication is different from the first certificate of authentication and the second certificate of authentication that serves to identify the authentication server.

The limited communication unit 112 does not provide for external communication with the key management device 120 and only communicates with the key management device 120 using an infrared communication, a local communication, a Bluetooth communication, and so on.

The encryption information management unit 113 can create the first certificate of authentication, the second certificate of authentication, the third certificate of authentication, and the secret key. Also, the encryption information management unit 113 creates and discards authentication information issued by the key management device 120.

The controller 116 receives the encryption key created by the key management device 120 and the electronically signed hash value through the wireless communication unit 111 to authenticate the wireless network device. In more detail, the received encryption key is encrypted using the public key of the access point 110 and can be received along with the hash value electronically signed by the secret key of the key management device 120. At this time, the controller 116 also receives the certificate of authentication of the key management device 120.

Since the controller 116 has the certificate of authentication issued from the certificate authority along with the public key that can authenticate all the certificates of authentication it issued, it authenticates the public key of the key management device 120 using the certificate of authentication of the key management device 120, decrypts the encryption key using its secret key, and authenticates the electronically signed hash value to perform authentication of the wireless network device.

If the wireless network device 200 logs out of a corresponding wireless network by communicating with the key management device 120, the limited communication unit 112 receives the MAC address of the corresponding wireless network device 200 and the controller 116 disconnects the network device, which has the same MAC address as the received MAC address, from the wireless network 100.

An exemplary, non-limiting procedure for creating the encryption key for the key management device 120, the wireless network device 200, and the access point 110 will be described as follows.

Figure 6:
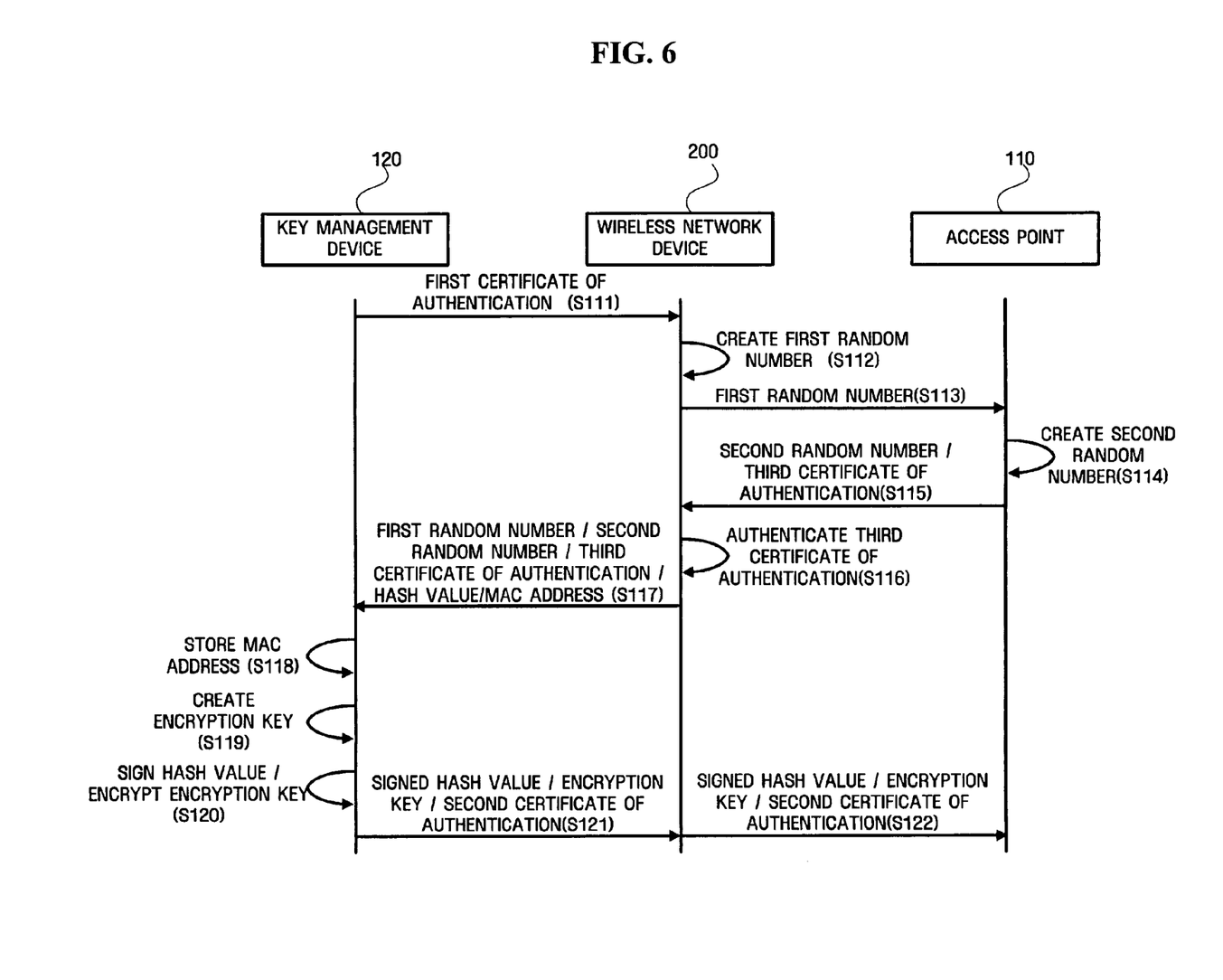
FIG. 6 is a view illustrating the procedure of creating an encryption key according to an exemplary, non-limiting embodiment of the present invention.

FIG. 6 illustrates the procedure of creating the encryption key according to an exemplary, non-limiting embodiment of the present invention.

In the exemplary embodiment of the present invention, the key management device 120 receives the first certificate of authentication issued by the access point 110, which serves as the certificate authority, the second certificate of authentication that it issued, and the secret key. The access point 110 has the first certificate, the third certificate of authentication that it issued, and the secret key.

As shown in FIG. 6, the key management device 120 transmits the first certificate of authentication to the wireless network device 200, in operation S111. The access point 110 according to the exemplary embodiment of the present invention serves as the certificate authority (e.g., issuing and discarding the certificate of authentication, and issuing the secret key) and the authentication server, which performs authentication with the wireless network device 120. The first certificate of authentication is the root certificate of authentication of the certificate authority. Therefore, the wireless network device 200 has the public key that can authenticate all the certificates of authentication issued by the access point 110 when it receives the first certificate of authentication.

Then, the wireless network device 200 creates the first random number and transmits it to the access point 110, in operation S113. The access point 110 that has received the first random number, creates the second random number in operation S114, and transmits the second random number and the third certificate of authentication to the wireless network device 200, in operation S115.

The wireless network device 200 authenticates the third certificate of authentication using the public key included in the first certificate of authentication in operation S116. If the third certificate of authentication is completely authenticated, the wireless network device 200 transmits the first random number, the second random number, the third certificate of authentication, the hash value of all the messages transmitted to and received from the access point 110 until authentication was completed, and its MAC address to the key management device 120, in operation S117. The first and second random numbers are used to create the encryption key in the key management device 120, and the hash value is used for authentication procedure with the access point 110. Also, the MAC address is used to process log-out of the wireless network device 200, if the wireless network device 200 logs out of the wireless network 100.

The key management device 120 stores the received MAC address, in operation S118, and creates the encryption key using the received first and second random numbers and a predetermined random number, in operation S119.

Furthermore, the key management device 120 electronically signs the hash value received from the wireless network device 200 using its secret key stored in the storage unit 122, and encrypts the encryption key created using the first random number and the second random number using the public key of the access point 110 included in the third certificate of authentication, in operation S120. Then, the key management device 120 transmits the electronically signed hash value and the encryption key to the wireless network device 200 along with the second certificate of authentication, in operation S121. The second certificate of authentication may be transmitted along with the first certificate of authentication in operation S111.

Then, the wireless network device 200 transmits the electronically signed hash value, the encryption key, and the second certificate of authentication to the access point 110 in operation S122. The access point 110 authenticates the second certificate of authentication through the public key included in the first certificate of authentication, decrypts the encryption key using its secret key, and authenticates the electronically signed hash value using the public key included in the second certificate of authentication.

If the electronically signed hash value is authenticated, the wireless network device 200 is allowed to log onto the wireless network 100 and to create a key to be used for communicating using the encryption key obtained by the decryption. If the electronically signed hash value is not authenticated, the wireless network device 200 is not allowed to log onto the wireless network 100.

As described above, in the wireless network device 200 according to the exemplary, non-limiting embodiment of the present invention, since the key management device 120 has a secret key for authentication procedure with the access point 110, the wireless network device 200 cannot log onto the wireless network 100 if there is no key management device 120. In other words, the wireless network device 200 can log onto the wireless network 100 only if there is the key management device 120. Also, the authentication information is only created in the key management device 120 using the secret key without exposing the secret key of the key management device 120 to the wireless network device 200. The wireless network device is provided with the created authentication information in order to log onto the wireless network 100. If the wireless network device 200 temporarily logs onto the wireless network 100, or frequently logs in and out of the wireless network, it does not need a pair of public keys from the certificate authority whenever it logs in and out of the wireless network (management of the network). The wireless network manager controls the wireless network device 200 by lending or collecting the key management device 120 so that the wireless network device 200 can temporarily log onto the wireless network.

Further, in an exemplary, non-limiting embodiment of the present invention, the validity of the first to third certificates is more flexible than the existing certificate of authentication, which is set on annual basis, as it can be set on a daily/time basis. The access point 110 according to an exemplary, non-limiting embodiment of the present invention directly issues the certificate of authentication to the wireless network device 200 if the wireless network device 200 does not support infrared, Bluetooth, or local communication methods. Also, the access point 110 serves to discard the issued certificate of authentication if the wireless network device 200 logs out of the wireless network 100.

Figure 7:
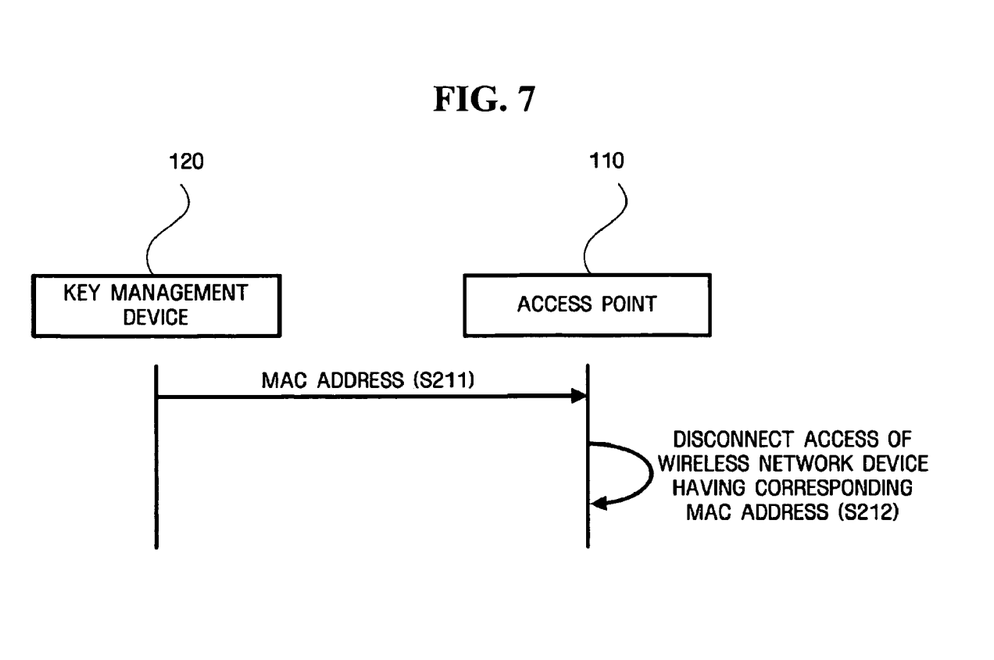
FIG. 7 is a view illustrating the procedure of logging out of the wireless network according to an exemplary, non-limiting embodiment of the present invention.

FIG. 7 illustrates the procedure for logging out of the wireless network according to an exemplary, non-limiting embodiment of the present invention.

As shown in FIG. 7, if the wireless network device 200 logs out of the wireless network 100, the network manager allows the access point 110 to access the key management device 120, and the key management device 120 transmits the MAC address of the corresponding wireless network device 200 to the access point 110 in operation S211.

The access point 110 then disconnects the wireless network device having the corresponding MAC address in operation S212.

The key management device 120 and the access point 110 transmit the MAC address to each other through the limited communication units 121 and 112 to prevent external eavesdropping.

The key management device 120 does not create the encryption key, but the wireless network device 200 can create the encryption key. In other words, the key management device 120 is involved only in authentication between the wireless network device 200 and the access point 110. The procedure of creating the encryption key is performed between the wireless network device 200 and the access point 110 as shown for example in FIG. 1.

Figure 8:
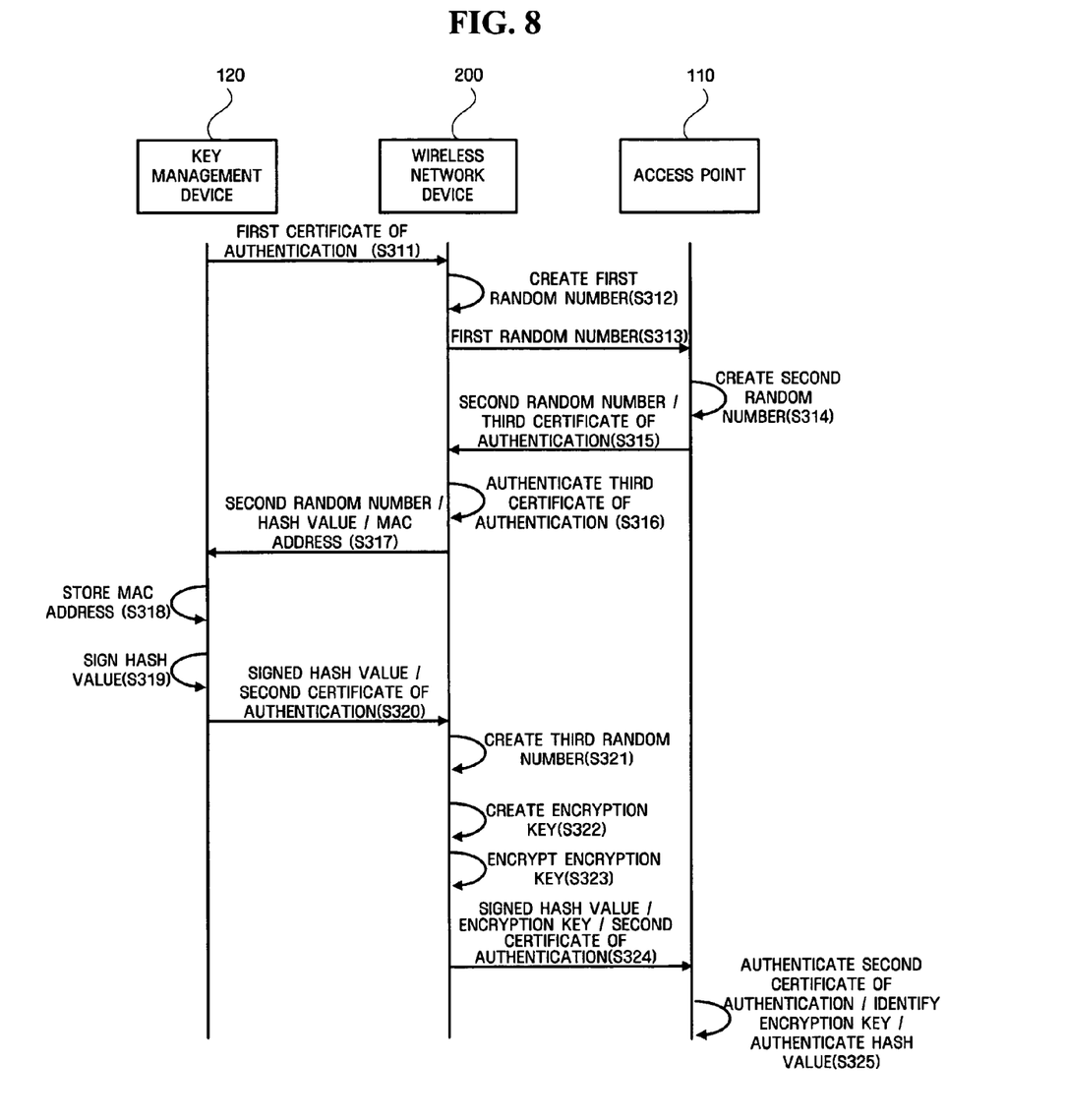
FIG. 8 is a view illustrating the procedure of authenticating a wireless network device according to an exemplary, non-limiting embodiment of the present invention.

FIG. 8 illustrates the procedure of authenticating the wireless network device using the key management device according to an exemplary, non-limiting embodiment of the present invention. Referring to FIG. 8, in an analogous manner to FIG. 7, the key management device 120 has the first certificate of authentication issued by the access point 110, its certificate of authentication, and the secret key. The access point 110 has the first certificate of authentication serving as the certificate authority, the third certificate of authentication corresponding to its certificate of authentication, and the secret key.

As shown in FIG. 8, the key management device 120 transmits the first certificate of authentication to the wireless network device 200 in operation S311. Therefore, the wireless network device 200 has the public key that can authenticate all the certificates of authentication issued by the access point 110.

Then, the wireless network device 200 creates the first random number in operation S312 and transmits the created first random number to the access point 110 in operation S313. The access point 110 that has received the first random number from the wireless network device 200 creates the second random number in operation S314 and transmits the created second random number and the third certificate of authentication corresponding to its certificate of authentication to the wireless network device 200, in operation S315. The wireless network device 200 authenticates the third certificate of authentication. If the third certificate of authentication is authenticated in operation S316, the wireless network device 200 transmits the second random number created by the access point 110, the hash value of all the messages transmitted from and received by the access point until authentication is completed, and its MAC address to the key management device 120, in operation S317.

The key management device 120 stores the received MAC address in operation S318, and electronically signs the hash value received from the wireless network device 200 using its secret key in operation S319.

Then, the key management device 120 transmits the signed hash value and the second certificate of authentication to the wireless network device 200, in operation S320.

Then, the wireless network device 200 creates the third random number in operation S321, and the encryption key using the first random number it created and the second random number received from the access point 110 in operation S322, and encrypts the created encryption key using the public key of the access point 110 in operation S323.

The wireless network device 200 transmits the signed hash value, the second certificate of authentication and the encryption key encrypted using the public key of the access point 110 to the access point 110, in operation S324. Since the access point 110 has the first certificate of authentication, the access point 110 authenticates the certificate of the key management device 120 by authenticating the second certificate of authentication, obtains the encryption key by decrypting the encryption key encrypted using its secret key, and authenticates the signed hash value in order to authenticate the wireless network device 200, in operation S325.

As described above, the wireless network device and the communication method according to exemplary, non-limiting embodiments of present invention may provide the following.

First, if the external network device temporarily logs onto the wireless network, the key management device existing in the corresponding wireless network creates an encryption key that can be temporarily used in the external network device so that setting of the network can be changed without affecting the existing wireless network.

Second, since the secret key for creating the encryption key provided to the external network device is only stored in the key management device, it is possible to prevent an external network device from accessing the network without permission.

Third, since the communication unit having a communication radius smaller than the distance between the wireless network devices of the wireless network is used for communicating between the key management device and the external network device, it is possible to maintain security during the transmission of the encryption key.

Although exemplary, non-limiting embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A key management device of a wireless network including an access point, the key management device comprising:
    a public key and a secret key of the key management device;
    a limited communication unit that receives encryption information from a wireless network device logging onto the wireless network; and
    a key creating unit that creates an encryption key based on the encryption information received by the limited communication unit, the encryption key being used by the wireless network device in wireless communication in the wireless network,
    wherein the wireless network device transmits, to the key management device, the encryption information and a hash value of messages transmitted to and received from the access point,
    wherein the key creating unit encrypts the encryption key by using a public key of the access point included in the encryption information and electronically signs the hash value by using the secret key,
    wherein the limited communication unit transmits, to the wireless network device, the encryption key encrypted by the key creating unit, the electronically signed hash value, and the public key of the key management device,
    wherein the wireless network device transmits, to the access point, the encryption key transmitted by the key management device, the electronically signed hash value, and the public key of the key management device,
    wherein the access point decrypts the encryption key transmitted by the wireless network device and authenticates the hash value, and
    wherein the wireless network device is allowed to log onto the wireless network according to authentication results of the access point.

2. The key management device as claimed in claim 1, wherein the limited communication unit has a communication radius that is smaller than a distance between wireless network devices of the wireless network.

3. The key management device of claim 2, wherein the limited communication unit uses at least one wireless communication of an infrared communication, a local communication, and a Bluetooth communication.

4. The key management device of claim 3, wherein the encryption information includes a first random number created by the wireless network device, a second random number created by the access point, and the public key of the access point,
    wherein the key creating unit creates the encryption key based on the first random number and the second random number,
    wherein the wireless network device creates the first random number, transmits the first random number to the access point, creates the encryption information based on the second random number transmitted by the access point and the public key of the access point, and transmits the encryption key transmitted by the key management device to the access point, and
    wherein the access point creates the second random number, and transmits the second random number and public key of the access point to the wireless network device.

5. The key management device of claim 4, wherein the encryption information includes a media access control (MAC) address of the wireless network device,
    wherein the key management device stores the MAC address, and transmits the MSC address of the wireless network device to the access point if the wireless network device logs out of the wireless network, and
    wherein the access point disconnects the wireless network device with the MAC address transmitted by the key management device.

6. The key management device as claimed in claim 1, wherein the key management device is a separate entity from an access point and wherein the key management device participates in an authentication procedure between the wireless network device and the access point.

7. The key management device as claimed in claim 6, wherein the wireless network device and the access point communicate in a cellular telephone network and wherein the key management device communicates in one of an infrared communication network, a near field communication network of a radius smaller than the cellular telephone network, and a Bluetooth communication network.

8. A wireless network device which performs wireless communication with a key management device and an access point included in a wireless network, the wireless network device comprising:
    a limited communication unit that transmits encryption information to the key management device;
    a wireless communication unit that performs communication with the access point;

a hash value generating unit that generates a hash value of messages transmitted to and received from the access point; and an authentication controller that performs authentication in the wireless communication with the access point by using an encryption key received by the limited communication unit, wherein the limited communication unit transmits the encryption information and the hash value to the key management device, wherein the key management device creates the encryption key based on the encryption information, encrypts the encryption key by using a public key of the access point included in the encryption information, electronically signs the hash value by using a secret key of the key management device, and transmits the encrypted encryption key, the electronically signed hash value, and a public key of the key management device to the wireless network device, wherein the wireless communication unit transmits, to the access point, the public key of the key management device, the electronically signed hash value, and the encrypted encryption key transmitted by the key management device, wherein the access point decrypts the encryption key transmitted by the wireless communication unit and authenticates the hash value, and wherein the wireless network device is allowed to log onto the wireless network according to authentication results of the access point.

9. The wireless network device of claim 8, wherein the encryption information includes a first random number created by the wireless network device, a second random number created by the access point, and a media access control (MAC) address of the wireless network device, and the public key of the access point.

10. The wireless network device of claim 9, wherein the encryption key is encrypted by the public key of the access point issued by the access point to the key management device.

11. The wireless network device of claim 10, wherein the public key of the access point is received together with the second random number.

12. The wireless network device of claim 8, wherein the limited communication unit has a communication radius that is smaller than a distance between wireless network devices of the wireless network.

13. The wireless network device of claim 12, wherein the limited communication unit uses at least one of an infrared communication, a local communication, and a Bluetooth communication.

14. An access point of a wireless network including a key management device, the access point comprising:

an encryption information management unit that issues encryption information for authentication of a wireless network device logging onto the wireless network;

a limited communication unit that communicates with the key management device;

a wireless communication unit that communicates with the wireless network device;

an authentication unit that performs the authentication of the wireless network device; and a communication controller that communicates with the authenticated wireless network device by using the encryption key, wherein the wireless network device generates a hash value of messages transmitted to and received from the access point, transmits the encryption information and the hash value to the key management device, and transmits the encryption key transmitted by the key management device, the electronically signed hash value, and a public key of the key management device to the access point, wherein the key management device creates the encryption key based on the encryption information, encrypts the encryption key by using a public key of the access point included in the encryption information, electronically signs the hash value by using a secret key of the key management device, and transmits the encrypted encryption key, the electronically signed hash value, and the public key of the key management device to the wireless network device, wherein the authentication unit decrypts the encryption key transmitted by the wireless network device and authenticates the hash value, and wherein the wireless network device is allowed to log onto the wireless network according to authentication results of the access point.

15. The access point of claim 14, wherein the encryption information includes a first random number created by the wireless network device, a second random number created by the access point, and the public key of the access point.

16. The access point of claim 15, wherein the encryption key is created by the key management device by using the first random number and the second random number.

17. The access point of claim 14, wherein the limited communication unit receives a media access control (MAC) address of the wireless network device transmitted from the key management device.

18. The access point of claim 17, wherein the limited communication unit has a communication radius that is smaller than a distance between wireless network devices in the wireless network.

19. The access point of claim 18, wherein the limited communication unit uses at least one wireless communication of an infrared communication, a local communication, and a Bluetooth communication.

20. A key management method in a key management device of a wireless network including an access point, the method comprising:

receiving encryption information from a wireless network device;

creating an encryption key based on the received encryption information, the encryption key being used by the wireless network device in wireless communication in the wireless network, and transmitting the created encryption key to the wireless network device, wherein the wireless network device transmits, to the key management device, the encryption information and a hash value of messages transmitted to and received from the access point, wherein in said creating an encryption key, the encryption key is encrypted by using a public key of the access point included in the encryption information and the hash value is electronically signed by using a secret key of the key management device, wherein in said transmitting the created encryption key, the encrypted encryption key, the electronically signed hash value, and the public key of the key management device are transmitted to the wireless network device, wherein the wireless network device transmits, to the access point, the encryption key transmitted by the key management device, the electronically signed hash value, and the public key of the key management device, wherein the access point decrypts the encryption key transmitted by the wireless network device and authenticates the hash value, and wherein the wireless network device is allowed to log onto the wireless network according to authentication results of the access point.

21. The key management method of claim 20, wherein said receiving encryption information includes receiving the encryption information by a wireless communication unit having a communication radius that is smaller than a distance between wireless network devices in the wireless network.

22. The key management method of claim 21, wherein the encryption information is received via at least one wireless communication of an infrared communication, a local communication, and a Bluetooth communication.

23. The key management method of claim 22, wherein the encryption information includes a first random number created by the wireless network device, a second random number created by the access point, and the public key of the access point.

24. The key management method of claim 23, wherein the secret key of the key management device is issued by the access point.

25. The key management method of claim 24, wherein said creating an encryption key includes creating the encryption key by using the first random number and the second random number, and encrypting the created encryption key by using the secret key to transmit the encryption key to the wireless network device.

26. A communication method of a wireless network device which performs wireless communication with a key management device and an access point included in a wireless network, the method comprising:

generating a hash value of messages transmitted to and received from the access point;

transmitting encryption information to the key management device;

receiving an encryption key from the key management device;

transmitting the received encryption key to the access point;

performing authentication in the wireless communication with the access point by using the received encryption key; and performing wireless communication with the access point of the wireless network by using the encryption key, wherein in said transmitting encryption information, the encryption information and the hash value are transmitted to the key management device, wherein the key management device creates the encryption key based on the encryption information, encrypts the encryption key by using a public key of the access point included in the encryption information, electronically signs the hash value by using a secret key of the key management device, and transmits the encrypted encryption key, the electronically signed hash value, and a public key of the key management device to the wireless network device, wherein in said transmitting the received encryption key, the public key of the key management device, the electronically signed hash value, and the encrypted encryption key transmitted by the key management device are transmitted to the access point, wherein the access point decrypts the encryption key transmitted by the wireless communication unit and authenticates the hash value, and wherein the wireless network device is allowed to log onto the wireless network according to authentication results of the access point.

27. The communication method of a wireless network device of claim 26, wherein the encryption information includes a first random number created by the wireless network device, a second random number created by the access point, a third certificate of authentication of the access point, and a media access control (MAC) address of the wireless network device.

28. The communication method of a wireless network device of claim 27, wherein the encryption key is encrypted by the public key of the access point issued from the access point to the key management device.

29. The communication method of a wireless network device of claim 28, wherein the public key of the access point is received together with the second random number.

30. The communication method of a wireless network device of claim 26, wherein the transmitted encryption information and the received encryption key are transmitted and received by a wireless communication unit having a communication radius that is smaller than a distance between wireless network devices in the wireless network.

31. The communication method of a wireless network device of claim 30, wherein the transmitted encryption information and the received encryption key are transmitted and received via at least one wireless communication of an infrared communication, a local communication, and a Bluetooth communication.

32. A communication method of an access point of a wireless network including a key management device, the method comprising:

transmitting encryption information to a wireless network device logging onto the wireless network;

receiving an encryption key transmitted from the wireless network device, performing authentication of the wireless network device, and communicating with the authenticated wireless network device by using the encryption key, wherein the wireless network device generates a hash value of messages transmitted to and received from the access point, transmits the encryption information and the hash value to the key management device, wherein the key management device creates the encryption key based on the encryption information, encrypts the encryption key by using a public key of the access point included in the encryption information, electronically signs the hash value by using a secret key of the key management device, and transmits the encrypted encryption key, the electronically signed hash value, and a public key of the key management device to the wireless network device, wherein the wireless network device transmits the encryption key transmitted by the key management device, the electronically signed hash value, and the public key of the key management device to the access point, wherein in said performing authentication, the encryption key transmitted by the wireless network device is decrypted and the hash value is authenticated, and wherein the wireless network device is allowed to log onto the wireless network according to authentication results of the access point.

33. The communication method of an access point of claim 32, wherein the encryption information includes a first random number created by the wireless network device, a second random number created by the access point, and the public key of the access point.

34. The communication method of an access point of claim 33, wherein the encryption key is created by using the first random number and the second random number.

35. The communication method of an access point of claim 32, further comprising receiving a media access control (MAC) address of the wireless network device from the key management device.

36. The communication method of an access point of claim 35, wherein the MAC address is transmitted by a wireless communication unit having a communication radius that is smaller than a distance between wireless network devices in the wireless network.

37. The communication method of an access point of claim 36, wherein the MAC address is transmitted and received via at least one wireless communication of an infrared communication, a local communication, and a Bluetooth communication.

38. The communication method of an access point of claim 37, further comprising disconnecting the wireless network device having the same MAC address as the received MAC address from the wireless network.

* * * * *